US008786685B1

(12) United States Patent
Sethna et al.

(10) Patent No.: US 8,786,685 B1
(45) Date of Patent: Jul. 22, 2014

(54) FULL-RESOLUTION SINGLE-LCD STEREOSCOPIC DISPLAY

(75) Inventors: Vijay M. Sethna, Fremont, CA (US); Tracy J. Barnidge, Marion, IA (US); Bruce D. Hufnagel, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 202 days.

(21) Appl. No.: 12/882,804

(22) Filed: Sep. 15, 2010

(51) Int. Cl.
*H04N 13/04* (2006.01)
*H04N 9/475* (2006.01)
*H04N 13/00* (2006.01)
*G02B 27/26* (2006.01)

(52) U.S. Cl.
CPC ........ *H04N 13/0434* (2013.01); *H04N 13/0436* (2013.01); *H04N 13/0456* (2013.01); *G02B 27/26* (2013.01); *H04N 13/0051* (2013.01)
USPC .......................................................... 348/58

(58) Field of Classification Search
None
See application file for complete search history.

(56) References Cited

U.S. PATENT DOCUMENTS

| 5,993,004 | A | * | 11/1999 | Moseley et al. ........... 353/8 |
| 8,134,779 | B2 | * | 3/2012 | Roh et al. ............... 359/465 |
| 8,189,039 | B2 | * | 5/2012 | Hiddink et al. ............ 348/59 |
| 2008/0316303 | A1 | * | 12/2008 | Chiu et al. ............... 348/51 |
| 2009/0051759 | A1 | * | 2/2009 | Adkins et al. ............ 348/53 |
| 2010/0007582 | A1 | * | 1/2010 | Zalewski ................. 345/8 |
| 2011/0032483 | A1 | * | 2/2011 | Hruska et al. ........... 353/8 |
| 2011/0074773 | A1 | * | 3/2011 | Jung ..................... 345/419 |
| 2011/0149030 | A1 | * | 6/2011 | Kang et al. .............. 348/43 |
| 2011/0254929 | A1 | * | 10/2011 | Yang et al. .............. 348/51 |
| 2012/0019883 | A1 | * | 1/2012 | Chae et al. ............... 359/11 |

* cited by examiner

*Primary Examiner* — Sath V Perungavoor
*Assistant Examiner* — Tyler W Sullivan
(74) *Attorney, Agent, or Firm* — Donna P. Suchy; Daniel M. Barbieri

(57) ABSTRACT

A stereoscopic display for displaying 3D images in the form of a stereo image pair. The stereoscopic display may include, but is not limited to, a display panel, a polarization layer, and an electro-optical panel. The display panel may include at least a first pixel and a second pixel. The polarization layer may include a first portion associated with the first pixel and a second portion associated with the second pixel.

12 Claims, 4 Drawing Sheets

FULL-RESOLUTION SINGLE-LCD STEREOSCOPIC DISPLAY

BACKGROUND

To obtain a stereoscopic image, images corresponding to each eye of a view must be provided. Stereoscopic displays may utilize two separate displays to provide the respective images to each eye of the viewer thereby increasing the complexity and size requirements of the display. Alternately, stereoscopic displays may use a single display in combination with active eyewear to provide the respective images to each eye of the viewer. Such configurations may result in observable flicker due to synchronization errors between the display and the eyewear.

As such, it may be desirable to provide a single-panel stereoscopic display which does not require the use of active eyewear.

SUMMARY

A stereoscopic display may include, but is not limited to: a display panel comprising: at least a first pixel and a second pixel; a polarization layer comprising: a first portion associated with the first pixel and a second portion associated with the second pixel; and an electro-optical panel.

BRIEF DESCRIPTION OF THE DRAWINGS

The disclosure will become more fully understood from the following detailed description, taken in conjunction with the accompanying drawings, wherein like reference numerals refer to like elements, in which Figure Reference No.

DETAILED DESCRIPTION

Figure 1:
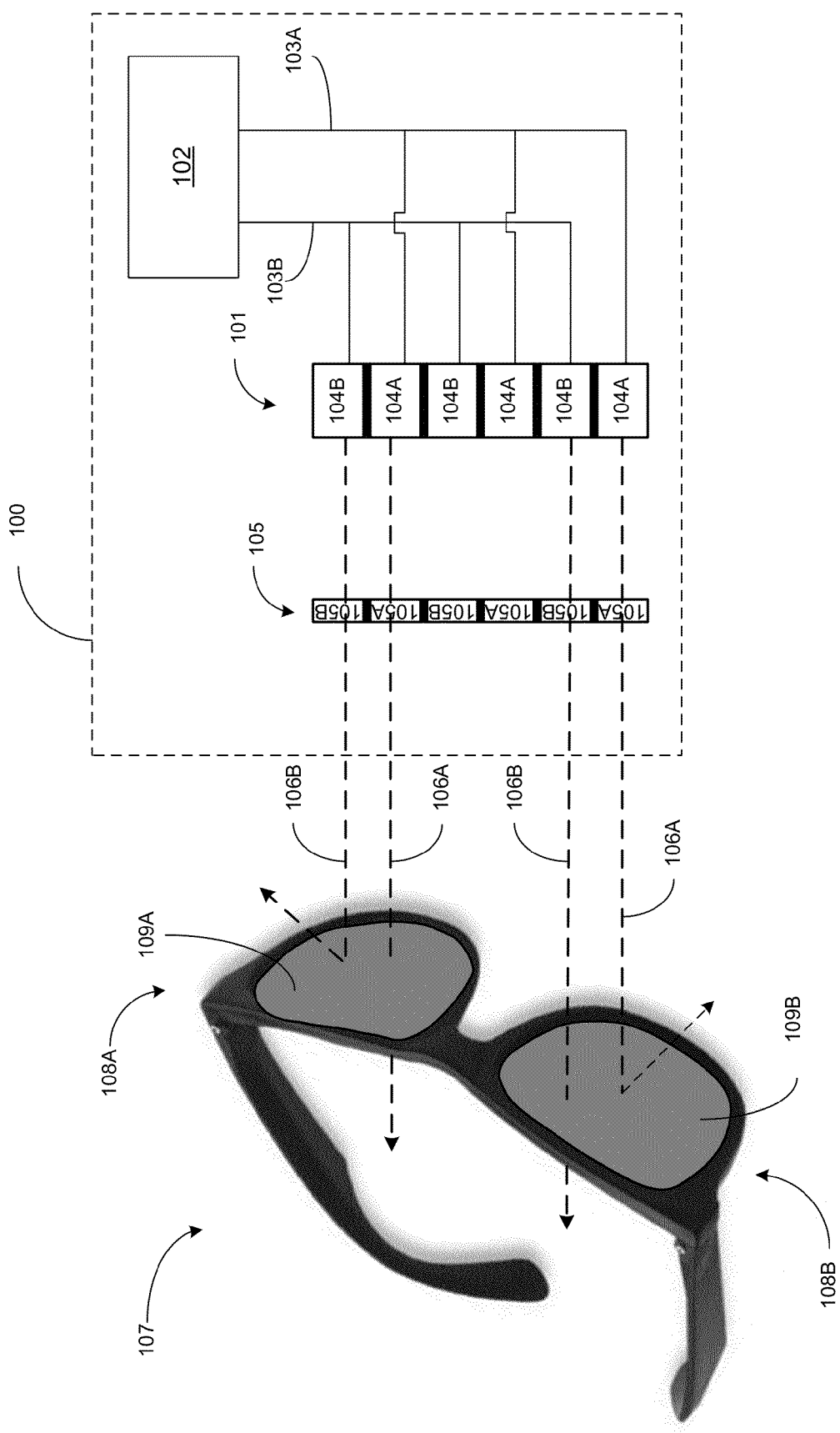
FIG. 1 illustrates an stereoscopic image display apparatus.

Before describing in detail the particular improved system and method, it should be observed that the invention may include, but may be not limited to a novel structural combination of conventional data/signal processing components and circuits, and not in the particular detailed configurations thereof. Accordingly, the structure, methods, functions, control and arrangement of conventional components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention may not be limited to the particular embodiments depicted in the exemplary diagrams, but should be construed in accordance with the language in the claims.

Referring to FIG. 1, a stereoscopic display system 100 is depicted. The stereoscopic display system 100 may include a display 101 (e.g. a transmissive electro-optical device such as a liquid crystal display, a suspended particle display, OLED and the like) which may be configured to display 3D images in the form of a stereo image pair including left and right images. The display 101 may be controlled by a stereoscopic image processor 102. The processor 102 may provide image data 103A associated with a left-channel of a stereoscopic image pair to at least one pixel (e.g. first pixel row 104A) of the display 101 and image data 103B associated with a right-channel of a stereoscopic image pair to at least one pixel (e.g. second pixel row 104B) of the display 101. The pixel row 104A and pixel row 104B may be interlaced in a horizontal or vertical manner.

The stereoscopic display system 100 may include a polarization rotation layer 105. Each pixel row 104 of the display 101 may be associated with (e.g. at least partially aligned with) a portion of the polarization rotation layer 105 where that portion is configured to impart a particular polarization to light received from the pixel row 104 to produce an output beam 106 emitted from the polarization rotation layer 105. For example, the polarization rotation layer 105 may include a portion 105A configured to impart a first polarization (e.g. right circular polarization) to light received from a first pixel row 104A to produce a polarized output beam 106A. Similarly, the polarization rotation layer 105 may include a portion 105B configured to impart a second polarization (e.g. left circular polarization) to light received light from a second pixel row 104B to produce a polarized output beam 106B. The portion 105A and the portion 105B may be configured such that output beam 106A is orthogonally polarized with respect to output beam 106B.

The stereoscopic display system 100 may be configured to operate in conjunction with polarized glasses 107. The polarized glasses 107 may include a viewing lens 108A and a viewing lens 108B. Each viewing lens 108 may include a base substrate (e.g. a glass substrate) and a lens polarization layer 109. The polarizations of the respective lens polarization layers 109 associated with the viewing lens 108A and the viewing lens 108B may be configured such that such that, when a viewer's polarized glasses 107 filter an output beam 106A having a first polarization and an output beam 106B having a second polarization, the lens polarization layer 109A of a left viewing lens 108A may transmit only output beam 106A while the lens polarization layer 109B of a right viewing lens 108B may transmit only output beam 106B, thereby enabling the viewer to see a complete stereoimage. For example, the lens polarization layer 109A and the lens polarization layer 109B may be configured to have substantially orthogonal polarizations. This configuration can be referred to as a spatially multiplexed display.

Figure 2:
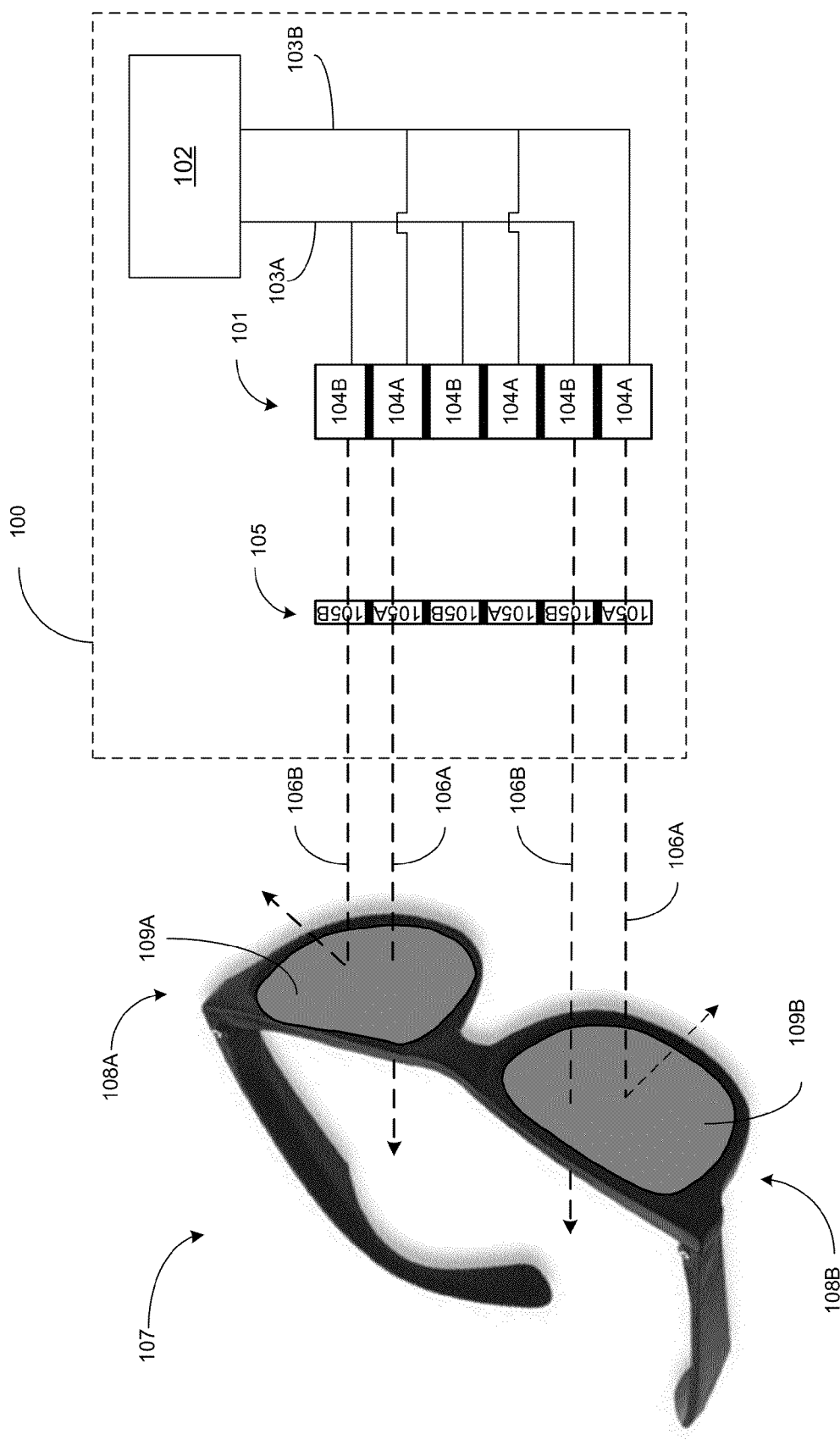
FIG. 2 illustrates an stereoscopic image display apparatus.

In the above described embodiment, the resolution of the stereoscopic display system 100 in the vertical or horizontal direction may be one-half of the total number of pixel rows (in a given direction) due to the association of the portion 105A and a portion 105B of the polarization rotation layer 105 with pixel row 104A and pixel row 104B of the display 101, respectively, in order to avoid reverse-stereoscopic effects as shown in FIG. 2.

In FIG. 2, the left-channel stereoscopic image data 103A and right-channel stereoscopic image data 103B have been shifted one pixel row, respectively, as would be required to enable full-resolution imaging using the stereoscopic display system 100. However, in such a configuration, left-channel image data 103A is provided to pixel row 104B and portion 105B while right-channel image data 103B is provided to pixel row 104A and portion 105A while portion 105B. In such a configuration, the polarizations imparted to the output beam 106A and output beam 106B by portion 105A and a portion 105B, respectively, where the left-channel image data 103A will be transmitted through the right viewing lens 108B (e.g. via output beam 106B) while the right-channel image data 103B will be transmitted through the left viewing lens 108A (e.g. via output beam 106A).

It should be noted that switching between image data 103A and image data 103B for pixel row 104A and pixel row 104B, respectively, as shown in FIGS. 1 and 2, does not produce a true full-resolution 3D display. FIG. 1 will produce a half-resolution 3D image. However, switching image data 103A and image data 103B for pixel row 104B and pixel row 104A as in FIG. 2 will produce an incorrect image in a failed attempt to achieve full 3D resolution.

It may be desirable to provide a stereoscopic display having full-resolution capabilities with respect to the total number of pixel rows. As described below in reference to FIGS. 3 and 4, an electro-optical panel 110 may allow for full-resolution 3D viewing by reversing the polarization associated with the pixel row 104A and pixel row 104B.

The stereoscopic display system 100 may include a display 101 having a overall frame rate of about 120 Hz (or integral multiples thereof). Full-resolution stereoscopic image frames may be displayed at about 60 Hz where each stereoscopic image frame includes at least two sub-frames. Further, the stereoscopic display system 100 may include an electro-optical panel 110 (e.g. a liquid crystal pi cell) disposed in the optical path between the display 101 and a viewer. For example, the electro-optical panel 110 may be disposed in front of a display 101 including the polarization rotation layer 105 (as shown in FIGS. 3-4) or between the display 101 and the polarization rotation layer 105 (not shown).

Figure 3:
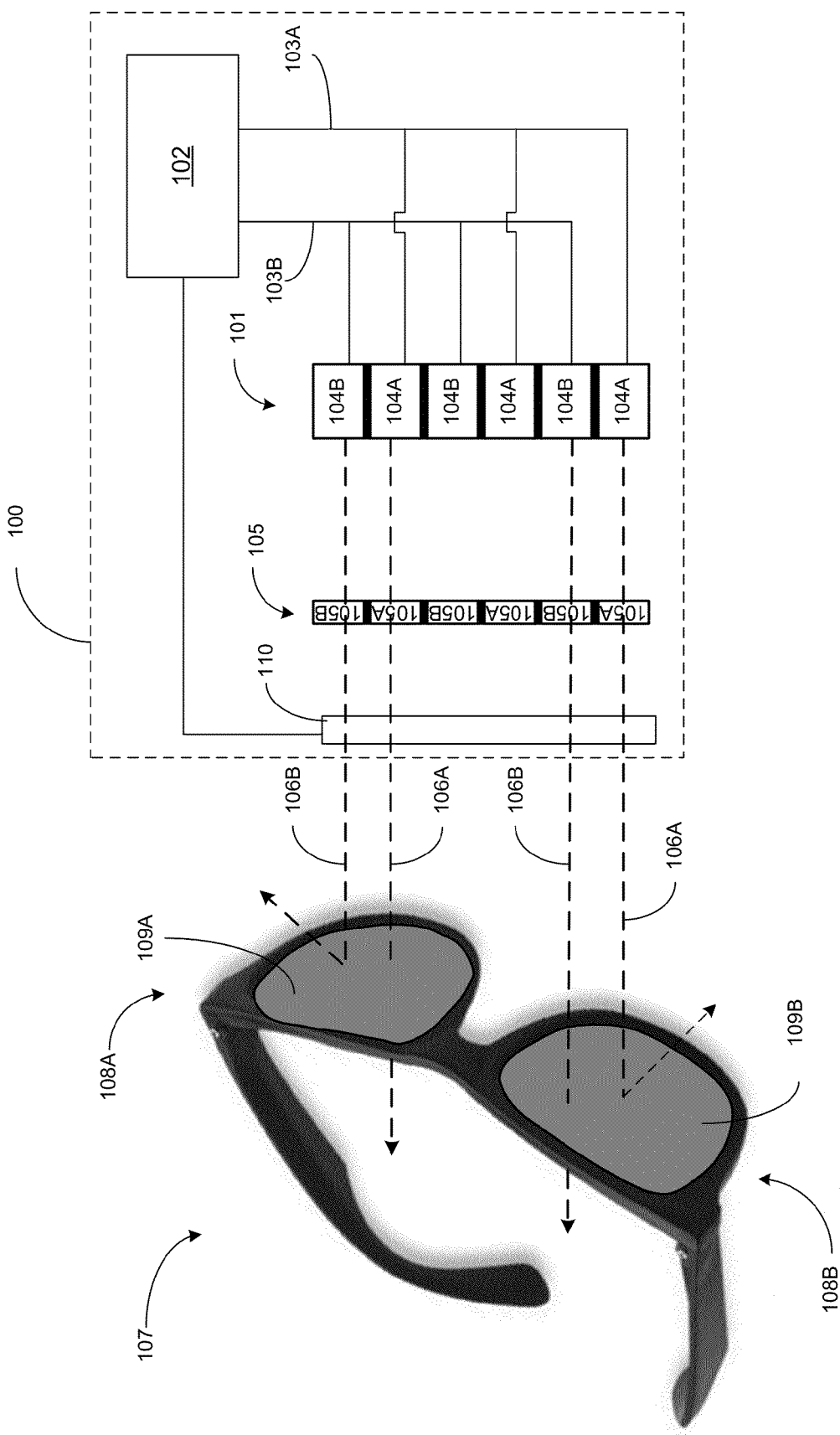
FIG. 3 illustrates an stereoscopic image display apparatus.

As shown in FIG. 3, in a first sub-frame, image data 103A associated with a first stereoscopic image channel (e.g. a left-channel image) is displayed in pixel row 104A (e.g. even-numbered rows) while image data 103B associated with a second stereoscopic channel (e.g. a right-channel image) is displayed in pixel row 104B (e.g. odd-numbered rows). The electro-optical panel 110 may be configured by the processor 102 to allow incident light to pass through without imparting a phase shift during the first sub-frame. As such, output beam 106A emitted from portion 105A will be polarized such that it may be transmitted through the lens polarization layer 109A but be blocked by the lens polarization layer 109B. Similarly, the output beam 106B emitted from portion 105B will be polarized such that it may be transmitted through the lens polarization layer 109B but be blocked by the lens polarization layer 109A.

Figure 4:
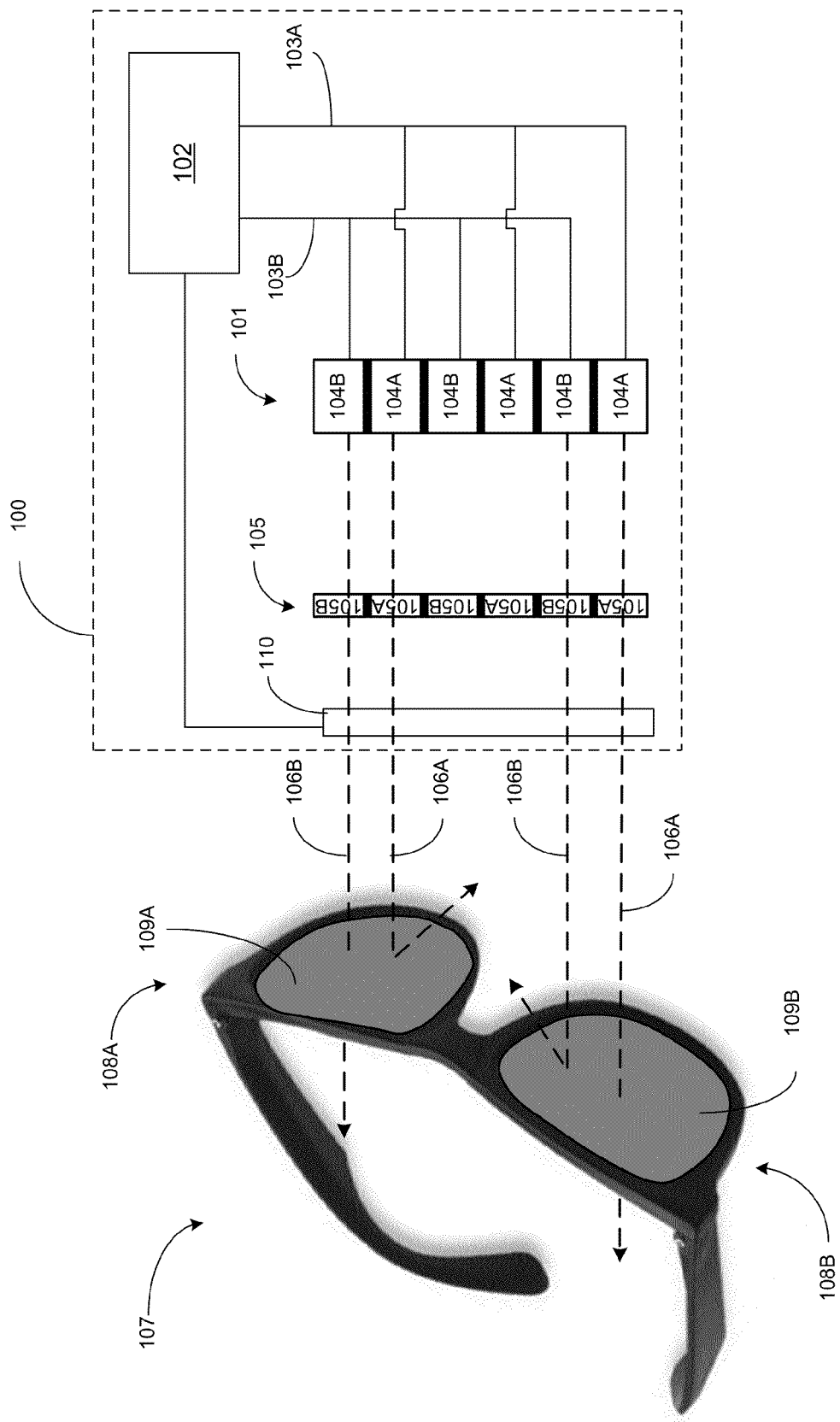
FIG. 4 illustrates an stereoscopic image display apparatus.

As shown in FIG. 4, in a second sub-frame, image data 103A associated with a first stereoscopic image channel (e.g. a left-channel image) is displayed in pixel row 104B (e.g. odd-numbered rows) while image data 103B associated with a second stereoscopic channel (e.g. a right-channel image) is displayed in pixel row 104A (e.g. even-numbered rows). The electro-optical panel 110 may receive a control signal from the processor 102 which causes the electro-optical panel 110 to alter its optical properties to impart a phase shift (e.g. a 90 or 180 degree phase shift) to incident light during the second sub-frame. As such, output beam 106A emitted from portion 105A will be polarized such that it may be transmitted through the lens polarization layer 109B but be blocked by the lens polarization layer 109A. Similarly, the output beam 106B emitted from portion 105B will be polarized such that it may be transmitted through the lens polarization layer 109A but be blocked by the lens polarization layer 1098.

The processor 102 may be used to coordinate the switching of the electro-optical panel 110 between states to correspond with the transitions between the first sub-frame and the second sub-frame in order to enhance their synchronization and reduce optical degradations (e.g. flicker, crosstalk).

By displaying the image data 103A associated with the first stereoscopic channel in the first pixel row 104A during the first sub-frame and in the second pixel row 104B in the second sub-frame while alternately displaying the image data 103B associated with the second stereoscopic channel in the second pixel row 104B during the first sub-frame and the first pixel row 104A in the second sub-frame, the stereoscopic display system 100 may achieve full-resolution capabilities for both stereoscopic channels. Further, by employing the electro-optical panel 110 to alter the respective polarization states of output beam 106A and output beam 106B, the stereoscopic display system 100 may be used without the need for active eyewear.

For example, the stereoscopic display system 100 may produce a full resolution 3D image without extinguishing light to the eyes as is the case with displays employing active shutter glasses. The observable flickering that shutter glasses produce, even when fast enough to become virtually unnoticeable, can cause fatigue because they completely block light to a first eye, then the other eye. The stereoscopic display system 100 described above removes flicker as a source of fatigue and sickness when viewing 3D images.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components configured and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A stereoscopic display system comprising:
a stereoscopic image processor;
a display panel comprising:
  a plurality of first pixels and a plurality of second pixels, wherein the plurality of first pixels includes at least a first row of pixels, wherein the plurality of second pixels includes at least a second row of pixels, wherein the at least the first row of pixels and the at least the second row of pixels are interlaced,
  wherein the display panel receives image data associated with a first channel of a stereoscopic image pair and the at least one first row of pixels and image data associated with a second channel of a stereoscopic image pair and the at least one second row of pixels;
a polarization rotation layer comprising:
  a plurality of first portions, each first portion being associated with a particular first row of the at least the first row, wherein each first portion of the polarization rotation layer is configured to impart a first polarization to the particular first row of the at least the first row, wherein each first portion is configured to impart a first polarization to light received from the particular first row during a first sub-frame of each stereoscopic image frame of a plurality of image frames; and
  a plurality of second portions, each second portion being associated with a particular second row of the at least the second row, wherein each second portion of the polarization rotation layer is configured to impart a second polarization to the particular second row of the at least the second row, wherein each second portion is configured to impart a second polarization to light received from the particular second row during the first sub-frame of each stereoscopic image frame of the plurality of image frames; and
an electro-optical panel configured to:
  receive light from each first portion of the polarization rotation layer and each second portion of the polarization rotation layer during each sub-frame of each stereoscopic image frame;
  alter polarizations associated with each of the at least the first row and the at least the second row by imparting a first phase shift during each first sub-frame;
  alter polarizations associated with each of the at least the first row and the at least the second row by imparting a second phase shift during each second sub-frame; and
  receive control signals from the stereoscopic image processor to coordinate the first phase shift and the second phase shift with transitions between each first sub-frame and each second sub-frame and with transitions between each second sub-frame and each first sub-frame, wherein the stereoscopic display system is configured for full 3D (three-dimensional) resolution with respect to a total number of pixel rows.

2. The stereoscopic display system of claim 1, wherein the electro-optical panel is an electro-optic polarization switch.

3. The stereoscopic display system of claim 2, wherein the electro-optic polarization switch is a liquid crystal pi cell.

4. The stereoscopic display system of claim 1, further comprising:
    viewing glasses comprising:
        a first lens configured to transmit light having the first polarization; and
        a second lens configured to transmit light having the second polarization.

5. The stereoscopic display system of claim 1, wherein the full 3D resolution of the stereoscopic display system in a horizontal direction is one-half of a total number of pixel rows of the horizontal direction.

6. The stereoscopic display system of claim 1, wherein the full 3D resolution of the stereoscopic display system in a vertical direction is one-half of the total number of pixel rows of the vertical direction.

7. The stereoscopic display system of claim 1, wherein full-resolution stereoscopic image frames are displayed at one-half of an overall frame rate.

8. The stereoscopic display system of claim 7, wherein the overall frame rate is a positive integral multiple of 120 Hertz.

9. The stereoscopic display system of claim 7, wherein the overall frame rate is 240 Hertz.

10. The stereoscopic display system of claim 7, wherein each stereoscopic image is displayed during a particular stereoscopic image frame, wherein the first sub-frame includes image data associated with a first channel which is displayed in an even-numbered pixel row, wherein the second sub-frame includes image data associated with a second channel which is displayed in an odd-numbered pixel row, wherein the first channel comprises one of a left-channel image or a right-channel image and wherein the second channel comprises the other of the left-channel image or the right-channel image.

11. The stereoscopic display system of claim 7, wherein the stereoscopic display system is configured to reduce flicker to a viewer.

12. The stereoscopic display system of claim 1, wherein the image data associated with the first channel in the at least the first row of pixels during the first sub-frame and in the at least the second row of pixels in the second sub-frame is displayed, while the image data associated with the second channel in the at least the second row of pixels during the first sub-frame and the at least the first row of pixels in the second sub-frame is alternately displayed.

* * * * *